United States Patent
Takei et al.

[11] Patent Number: 5,507,868
[45] Date of Patent: Apr. 16, 1996

[54] PAN COATING APPARATUS WITH LOUVERED AIR SUPPLY GUIDE

[75] Inventors: Narimichi Takei, Hamamatsu; Masanori Ogawa, Hamakita; Mamoru Sugiyama; Kazuomi Unosawa, both of Hamamatsu, all of Japan

[73] Assignee: Freund Industrial Co., Ltd., Tokyo, Japan

[21] Appl. No.: 397,577

[22] Filed: Mar. 2, 1995

[30] Foreign Application Priority Data

Mar. 3, 1994 [JP] Japan .................... 6-032724

[51] Int. Cl.⁶ .................................................. A23G 3/00
[52] U.S. Cl. ............................. 118/19; 34/606; 118/20; 118/24; 118/64; 118/303; 118/308; 118/418
[58] Field of Search ...................... 118/19, 20, 24, 118/64, 303, 308, 418; 34/595, 606, 609

[56] References Cited

U.S. PATENT DOCUMENTS

| | | | |
|---|---|---|---|
| 3,285,223 | 11/1966 | Sahlin | 118/64 |
| 3,834,347 | 9/1974 | Motoyama et al. | 118/19 |
| 3,934,545 | 1/1976 | Schady | 118/303 |
| 4,064,831 | 12/1977 | Okawara | 118/303 |
| 4,363,285 | 12/1982 | Yoshida et al. | 118/19 |
| 4,586,457 | 5/1986 | Dunajtschik | 118/19 |
| 5,050,528 | 9/1991 | Yamada et al. | 118/19 |
| 5,238,494 | 8/1993 | Dunajtschik | 118/19 |
| 5,334,244 | 8/1994 | Bohle | 118/19 |

FOREIGN PATENT DOCUMENTS 5-309253  11/1993  Japan .

Primary Examiner—Laura Collins
Attorney, Agent, or Firm—Kane, Dalsimer, Sullivan, Kurucz, Levy, Eisele and Richard

[57] ABSTRACT

An apparatus for applying a coating to a powdery or granular material has a rotary drum 20 including a tubular portion 21 formed with air holes 27 and hollow shaft portions 23 and 24 provided at opposite end portions in the axial direction. A coating chamber 26 is defined inside the rotary drum 20. Liquid is sprayed from a nozzle 32 onto an accumulated layer 33 of a powdery or granular material in the coating chamber 26. Drying gas supplied from an air supply duct 45 is introduced into the rotary drum 20 from one of the two hollow shaft portions 23 and 24. A plurality of axially extending air ducts 34 are provided on the outer periphery of the rotary drum 20. When an air duct is positioned downwardly it is communicated with an air exhaust duct 41 through a distributor 35. Air introduced from the air supply duct 45 is biased toward the accumulated layer 33 by louvers 48.

3 Claims, 5 Drawing Sheets

PAN COATING APPARATUS WITH LOUVERED AIR SUPPLY GUIDE

BACKGROUND OF THE INVENTION

1. Field of the Invention

This invention relates to a pan coating apparatus for applying pharmaceutical coating layer, sugar coating or film coating onto a powdery material, a granular material such as a tablet and a granular foodstuff, and the like.

2. Related Art Statement

In order to apply a sugar coating or a film coating onto a powdery material, a granular material such as pharmaceutical tablets, granular food stuffs, or the like, there has been used a pan coating apparatus, which is otherwise called a granulating-coating apparatus or a tablet coating apparatus. The fundamental structure of the pan coating type apparatus is disclosed in U.S. Pat. No. 3,834,347. The apparatus of No. 3,834,347 has been improved variously and is most commonly used at present.

The pan coating apparatus of No. 3,834,347 is shown in FIG. 6(A), and has a rotary drum 1 called a coating pan which is rotated about a substantially horizontal rotary axis. Shaft portions 2 and 3 are provided at opposite end portions in the axial direction of the rotary drum 1. The rotary drum 1 is made rotatable by bearings, not shown, for supporting these shaft portions 2 and 3.

An openable lid 4 is opened, and a powdery or granular material such as tablets is supplied into the rotary drum 1. Coating liquid is sprayed through a nozzle 6 onto a layer 5 of the powdery or granular material accumulated at a bottom portion of the rotary drum 1.

In order to dry the coating liquid applied onto the powdery or granular material, the largest diameter portion of the rotary drum 1 is formed of porous plates having a multitude of air holes 7, and a multitude of air ducts 8 communicated with the interior of the rotary drum 1 through the air holes 7 are provided on the outer periphery of the rotary drum 1 along the axial direction, respectively. Air for drying, which is introduced into the rotary drum 1 through an air supply duct 9, flows Through the accumulated layer 5 of the powdery or granular material, thereafter, is guided into the air ducts 8 positioned at the lower side of the rotary drum 1 in accordance with the rotating position of the rotary drum 1, and is discharged into an air exhaust duct 11 through a distributor 10.

Pan coating apparatuses have the above-described fundamental structure, and are of various types depending upon air introducing and exhausting systems.

FIG. 6(B) is a view showing another pan coating apparatus similar to the above-described apparatus, and corresponds to a cross-section of FIG. 6(A). In the air introducing system in this case, air is supplied or exhausted through an air duct 8a which is positioned at the upper side of the rotary drum 1 in accordance with the rotating position of the drum 1 and substantially opposed to the accumulated layer 5, and air is exhausted or supplied through an air duct 8b positioned at the lower side of the rotary drum 1 and under the accumulated layer 5 due to the rotation. The communication of the air supply or exhaust ducts and the upper and lower air ducts 8a and 8b is achieved by a distributor, not shown. The pan coating apparatus having this structure is described in Japanese Patent Laid-Open No. 60-500894, which corresponds to U.S. Pat. No. 4,586,457 and German patent No. 3310031.

FIG. 6(C) is a view showing a schematic construction of a pan coating apparatus described in Japanese Patent Laid-Open No. 2-207833, which corresponds to U.S. Pat. No. 5,050,528 and German Pat. No. 69001827. In the air introducing system of this apparatus, an inner duct 9a for supplying air is projected into the rotary drum 1 and the air is blown out of a cut-away portion 9b of the inner duct 9a into the rotary drum 1, and the air blow-out direction is made variable.

In the above-described conventional apparatuses, air can be supplied through the air exhaust duct 11 and exhausted through the air supply duct 9, whereby the direction of air flow can be inverted.

FIG. 6(D) is a view showing a schematic construction of an apparatus described in Japanese Patent Laid-Open No. 5-309253, in which an opening 12 communicated with the air supply duct 9 is formed in a central portion of one end of the rotary drum 1 and a hemispherical or truncated cone-shaped airflow control plate 13 is provided in the rotary drum 1 in a manner to cover this opening 12. The central portion of the airflow control plate 13 is blind and through-holes are formed in the other portion.

However, the following disadvantages are presented in the conventional apparatuses, in which the above-described various air introducing systems are used.

Firstly, in the apparatus shown in FIG. 6(A), air is caused to flow from the side of a hollow shaft portion 2 toward below a shaft portion 3 in the rotary drum 1. When, particularly, a sectional area of the air supply duct 9 for supplying air into the rotary drum 1 is small, the flow rate of the introduced air becomes high, whereby liquid drops of the sprayed coating liquid are caused to flow away, so that a satisfactory spray pattern cannot be obtained, and the coating liquid adheres ununiformly to the powdery or granular material.

When the sectional area of the air supply duct 9 is increased, the flow rate is decreased and the turbulence of the spray pattern is reduced. In that case, however, the air flow course leans toward the left side of the rotary drum 1 in the drawing, whereby the air flow through the accumulated layer 5 at the right side becomes unsatisfactory, so that the drying efficiency is decreased.

The apparatus shown in FIG. 6(B) is constructed such that air is introduced from the air duct 8a positioned upwardly in the rotary drum 1, so that such an advantage is offered that air flows moderately from above to below over the whole rotary drum 1, so that the spray pattern is not turbulent. However, when an air duct is rotated to the upper position 8a, it is used for introducing air, and when the same air duct is rotated to the lower position 8b, the air duct is used for the exhaust of air. Thus, if dust of dried particles of the sprayed coating liquid and of worn granular material intrudes into the air duct during the exhaust of air, then, when the air duct is rotated to the upper position 8a, the dust is blown back into the rotary drum 1 and adheres to the surfaces of the powdery or granular material, thus making the finish of the coating unsatisfactory.

In this apparatus, when a type of a powdery or granular material to be coated is changed, dust generated by the processed powdery or granular material and by dried particles of a coating liquid remains in the air ducts and adheres to a new powdery or granular material. Therefore, particularly when a pharmaceutical powdery or granular material is to be processed, a serious problem is caused from the viewpoint of GMP (Good Manufacturing Practice). Therefore, when a type of a powdery or granular material is to be changed, the air ducts should be carefully cleaned, thus taking a long time for the cleaning.

In the apparatus shown in FIG. 6(C), the flow rate of air at the air blow-out portion is high and the turbulence of the spray pattern is caused although there is difference depending upon the position of the inner duct 9a which is projected into the rotary drum 1, the dimensions of the air blow-out opening 9b, and the direction of air blow-out. Furthermore, even if the blow-out opening is positioned downwardly, air flow in the inner duct 9a becomes substantially of high rate, whereby air is blown out toward the left side of the rotary drum 1 in the drawing, and there may occur adherence of the coating liquid to the inner surface of the rotary drum 1, or a so-called dusting phenomenon, in which the liquid drops of the coating liquid are dried to form particles before they reach the powdery or granular material. If the pipe diameter of the inner duct 9a is increased, this disadvantage may be relaxed to some degree. However, from the construction of the apparatus, in which the inner duct 9a is projected into the rotary drum 1, the pipe diameter cannot be increased to the extent where the disadvantage can be entirely obviated.

When a direction of air flow is inverted in the above-described three types of apparatuses, air flows against spraying of the coating liquid, whereby the spray pattern becomes extremely turbulent, and further, such a disadvantage is presented that dusting tends to occur.

Particularly, when sugar is coated on a powdery or granular material by use of the apparatus shown in FIG. 6(C), a part of the powdery or granular material is raised by the rotation of the rotary drum 1, thereafter, drops onto the top surface of the inner duct 9a and adheres thereto or is accumulated thereat. Thereafter, when the adhered powdery or granular material falls and contaminates the finished granules which has been coated, a variation in weight between the granules is increased and defective products may be produced in some case.

In the apparatus shown in FIG. 6(D), air is blown out toward the whole outer periphery of the rotary drum 1, so that air flow in the rotary drum 1 becomes turbulent and the spray pattern becomes unsatisfactory. Moreover, the airflow control plate 13 is projected into the rotary drum 1, whereby, when sugar coating is applied, the raised granular material adheres to the airflow control plate 13, so that the disadvantage similar to the case of FIG. 6(C), where the inner duct is used, is presented. Further, in the case that the airflow control plate 13 is projected into the rotary drum 1 in a manner to cover the opening 12, when the interior of the apparatus including the air supply duct 9 is cleaned, cleaning liquid remains in the airflow control plate 13 and the cleaning liquid intrudes into the air supply duct 9, whereby cleaning works become troublesome. Further, it is undesirable from the viewpoints of GMP (Good Manufacturing Practice) and validation.

SUMMARY OF THE INVENTION

It is an object of the present invention to provide a pan coating apparatus capable of satisfactorily forming a spray pattern of liquid drops onto an article to be coated.

It is another object of the present invention to provide a pan coating apparatus capable of performing coating of high quality without variation in weight of finished products.

It is a further object of the present invention to provide a pan coating apparatus capable of cleaning the interior of the apparatus easily.

The above-described and other objects, and the novel features of the present invention will become apparent more fully from the following description and the accompanying drawings.

Among the inventions disclosed herein, typical one is outlined as follows.

A pan coating apparatus comprises a rotary drum rotatably supported about a substantially horizontal axis, inside of which a coating chamber is defined, and a plurality of air ducts provided on the outer periphery of the rotary drum in the axial direction and each communicated with the coating chamber through air holes formed in the rotary drum. Gas is introduced into the rotary drum through an air supply duct, and an opening of the air supply duct is provided in the vicinity of an end portion of the coating chamber and is provided with a guide member for guiding the gas to the lower portion of the rotary drum toward an accumulated layer of a material to be processed.

The guide member is positioned out the end portion of the coating chamber of the rotary drum In the axial direction. The guide member may be formed as louvers composed of a plurality of plate members. The outlet opening of the air supply duct may be of a diameter larger than its diameter at the upstream side.

In the above-described pan coating apparatus, the gas introduced from the opening of the air supply duct into the rotary drum is guided by the guide member downwardly toward the accumulated layer of the powdery or granular material, whereby, in combination with sucking action of the air exhaust duct, the air flow formed in the coating chamber passes through the accumulated layer without being turbulent. With this arrangement, the spray pattern of the liquid which is coated on the powdery or granular material by a liquid spraying means is not turbulent, whereby a satisfactory spray pattern is formed and the liquid is uniformly coated onto an individual particle of the powdery or granular material.

Since the satisfactory spray pattern is formed, there is no variation in weight between the coated particles. Moreover, even if a part of the powdery or granular material is moved upward along with rotation of the rotary drum, it does not adhere to any projected portions of the apparatus and immediately returns to the accumulated layer, so that high quality coating without variation in weight can be performed. During the cleaning of the apparatus, the cleaning liquid does not remain on the guide member or is not caught by the guide member, whereby it is advantageous from the viewpoints of GMP and validation, cleaning works are facilitated, and working efficiency can be improved.

The outlet opening of the air supply duct is made to have a diameter larger than a diameter of the air supply duct at the upstream side, so that a gas flow rate can be changed at the outlet opening. The flow rate of the gas supplied to the accumulated layer and the direction of the air flow can be changed by the guide member to set the optimum coating processing conditions.

DETAILED DESCRIPTION OF THE PREFERRED EMBODIMENT

Figure 1:
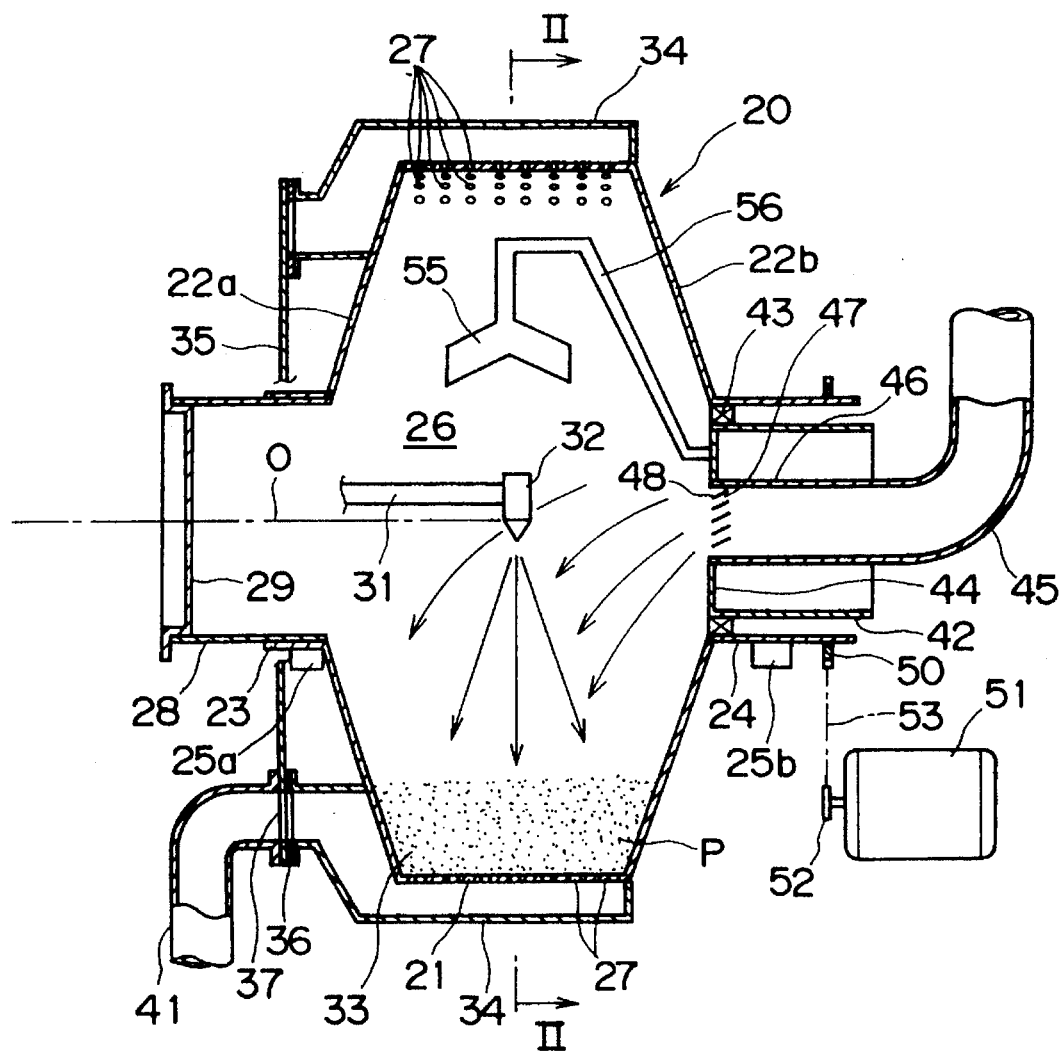
FIG. 1 is a cross-sectional view showing one embodiment of the pan coating apparatus according to the present invention.

As shown in FIG. 1, a rotary drum 20, which may otherwise be called a coating pan, includes a cylindrical tubular portion 21, truncated cone-shaped end plate portions 22a and 22b which are integral with the tubular portion 21 at opposite ends of the tubular portion in the axial direction, and hollow shaft portions 23 and 24 which are integrally provided at the opposite ends of the tubular portion 21 via the end plate portions 22a and 22b. As for the shape of the end plate portions, except for the truncated cone-shape as shown, a flat shape perpendicular to the tubular portion 21 may be adopted, or a pyramidal or a recessed shape may be adopted.

The rotary drum 20 is rotatably supported on a support member, not shown, at the hollow shaft portions 23 and 24 through bearing rollers 25a and 25b in a manner to be rotated about a substantially horizontal rotary axis 0.

In the rotary drum 20, a coating chamber 26 for containing a powdery or granular material P as being articles to be coated such as tablets is formed. The tubular portion 21 of the rotary drum 20 is formed therein with a multitude of air holes 27 for communicating the exterior of the tubular portion 21 with the coating chamber 26. The respective air holes 27 are adapted to pass a drying gas, generally air. The inner diameter of the air holes is smaller than the powdery or granular material P, although the drawings show exaggeratedly large holes.

The left side in FIG. 1 is an operation side of the apparatus. Into the hollow shaft portion 23 on the operation side, is coupled a cylindrical member 28, which is fixed to a support member, not shown. This cylindrical member 28 is provided with an openable lid 29 for opening or closing the hollow shaft portion 23, for charging the powdery or granular material P into the coating chamber 26. Furthermore, the cylindrical member 28 is provided with a liquid pipe 31, and a spray nozzle 32 for spraying liquid such as a coating liquid and a binder liquid is secured to the forward end of this liquid pipe 31. A liquid such as a coating liquid is sprayed from the spray nozzle 32 and coated onto the accumulated layer 33, i.e., the layer of the powdery or granular material accumulated on a bottom portion of the rotary drum 20.

The outer periphery of the rotary drum 20 is provided thereon with a plurality of air ducts 34 in directions along the rotary axis 0. In the embodiment shown in FIG. 2, eight air ducts 34 in total are provided, although this number can be set at optional one. The communicating end portions of the respective air ducts 34 extend to the front side (operation side) in excess of the end plate portion 22a. A distributor 35 is positioned at the outer side of the hollow shaft portion 23, being arranged in contact with the communicating end portions. This distributor 35 is fixed to a support member, not shown, and the respective air ducts 34 are brought into sliding contact with the rear surface of the distributor 35 through seal members 36 provided in the respective communicating end portions.

A communicating hole 37 is formed downwardly of the distributor 35, and an air exhaust duct 41 is connected to the front of the distributor 35, being communicated with this communicating hole 37. This air exhaust duct 41 is provided with a fan, not shown, whereby air in the air duct, which has been moved to the bottom position by the rotation of the rotary drum 20, is exhausted to the outside by the operation of the fan.

On the rear side, i.e. the side opposite to the operation side of the apparatus, a cylindrical member 42 is coupled into the hollow shaft portion 24 of the apparatus, and an annular seal member 43 is assembled between this cylindrical member 42 and the hollow shaft portion 24. Inside the cylindrical member 42, a communicating end portion 46 of an air supply duct 45 is positioned, and the communicating end portion 46 is connected to an end plate 44 provided at an inner end of the cylindrical member 42. At the portion connected to the end plate 44, i.e., a boundary between the coating chamber 26 and the air supply duct 45, the communicating end portion 46 has an outlet opening 47. Drying air is supplied into the rotary drum 20 through this outlet opening 47. In accordance with the flow rate of the supplied air, the diameter of the communicating end portion 46 of the air supply duct 45 can be set at a desirable diameter within the range defined by the diameter of the cylindrical member 42, or the cylindrical member 42 itself may be made to be the communicating end portion 46.

Figure 2:
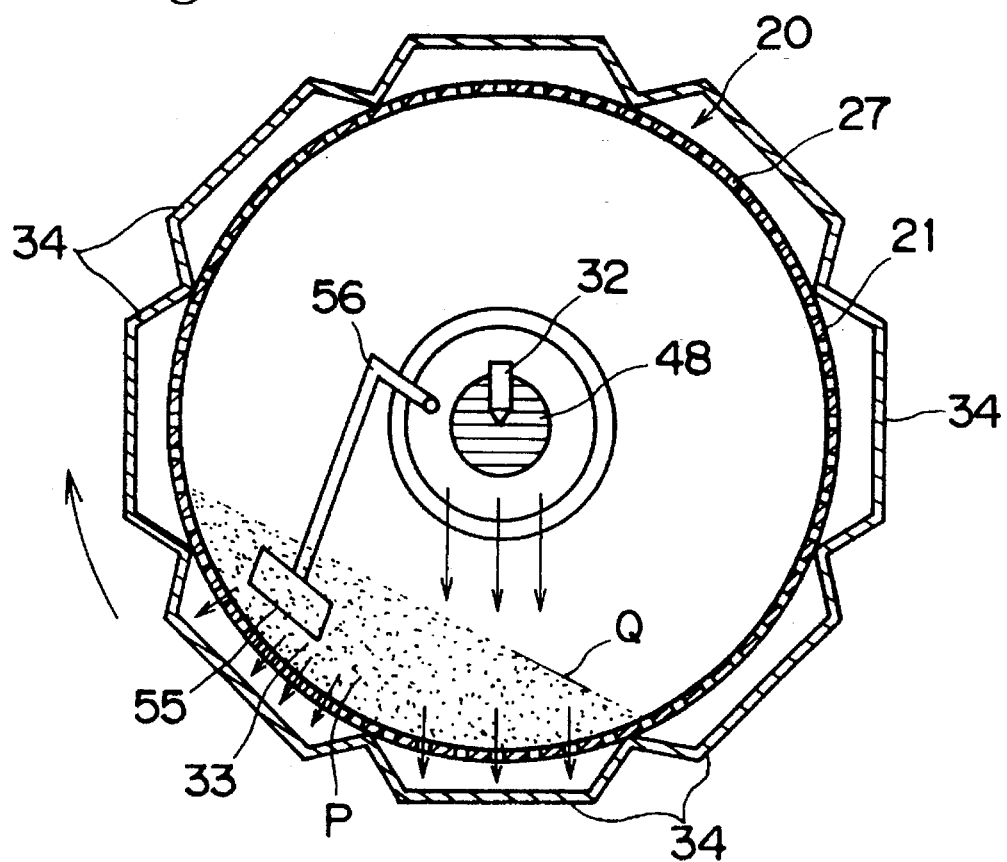
FIG. 2 is a cross-sectional view taken along the line II—II in FIG. 1.
Figure 3:
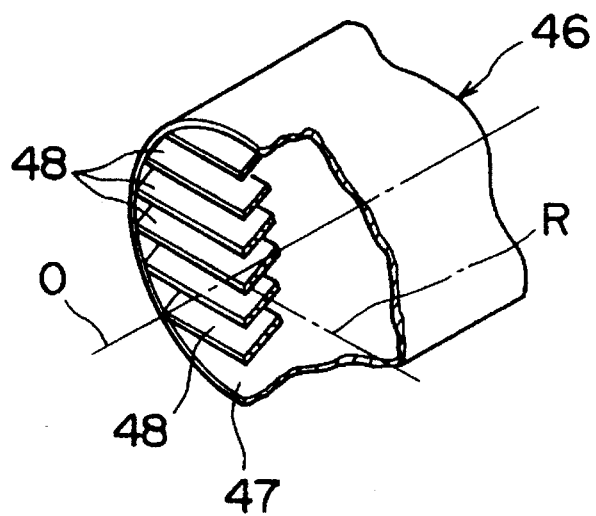
FIG. 3 is a partially cutaway perspective view showing a communicating end portion of an air supply duct.

As shown in FIGS. 2 and 3, in the outlet opening 47 of the air supply duct 45, there are provided a plurality of louvers (louver boards) 48 in the substantially perpendicular direction to the rotary axis 0, each louver extending in the horizontal direction. Respective louvers 48 are otherwise called guide vanes, fins or window louvers, and are downwardly inclined in their widthwise directions into the rotary drum 20. With this arrangement, air supplied into the rotary drum from the air supply duct 45 is guided to the bottom of the rotary drum 20 toward the accumulated layer 33 by the louvers 48 as indicated by the arrows in FIGS. 1 and 2. Accordingly, the louvers 48 have a function of guiding air supplied into the rotary drum 20 from the outlet opening 47 of the air supply duct 45 toward the accumulated layer 33, thus forming a guide member. Any member having the above-described function can be used in place of the louvers 48.

In order to drive the rotary drum 20 to rotate about the central axis 0, a sprocket 50 is fixed to the hollow shaft portion 24, and a chain 53 is stretched between a sprocket 52 of the motor 51 and the sprocket 50 to mesh them.

In order to agitate the accumulated layer 33, a baffle 55 is provided inside the rotary drum 20. This baffle 55 is secured to the forward end of a rocking arm 56, and moved between an operating position shown in FIG. 2 and a resting position shown in FIG. 1. When the rotary drum 20 is rotated in a state where the baffle 55 is set at the operating position, the accumulated layer 33 can be agitated by the baffle 55.

Next, there is described procedures of applying coating to the particle surfaces of the powdery or granular material by use of the above-described pan coating apparatus.

Articles to be coated, i.e., the powdery or granular material P, such as tablets are charged into the coating chamber 26 in the rotary drum 20 through the opened lid 29. In a state where the rotary drum 20 is rotated by the motor 51 after the powdery or granular material P is charged, the coating liquid is sprayed from the spray nozzle 32 and air is supplied into the rotary drum 20 from the air supply duct 45. The powdery or granular material P follows the rotating drum 20 as the latter is rotated, so that a surface Q of the accumulated layer 3 is inclined as shown in FIG. 2 if the rotating direction of the rotary drum 20 is one indicated by the arrow.

An air duct 34 is brought into a state of being communicated with the air exhaust duct 41 when that air duct is positioned at the lower side of the rotary drum 20, i.e., under the accumulated layer 33 in accordance with the rotating position of the rotary drum 20, whereby, by the action of a sucking fan, not shown, which is provided in the air exhaust duct 41, air in the coating chamber 26 flows through the accumulated layer 33 and through the air duct 34, and then, is discharged to the outside.

By the exhaust of air through the air exhaust duct 41 and the introduction of air through the air supply duct 45, air is supplied into the coating chamber 26 from the outlet opening 47 of the air supply duct 45, and guided and biased toward the accumulated layer 33 by the louvers 48. With this arrangement, the air flow in the rotary drum 20 is directed to the accumulated layer 33 without being turbulent, whereby the powdery or granular material can be uniformly coated without the spray pattern from the nozzle 32 being turbulent.

The spraying pattern is satisfactorily formed and maintained without being turbulent, so that high quality coating can be performed without weight variation between the coated granules. Moreover, the louvers 48 provided at the outlet opening 47 are not projected into the rotary drum 20, whereby, even if a part of the powdery or granular material P is moved upwardly by the rotation of the rotary drum 20, that part of the material P directly and immediately drops onto the accumulated layer 33 so that the process of high quality can be performed without producing the variation in weight.

The cleaning liquid used for the portion of the louvers 48 during the cleaning of the interior of the apparatus is not caught by the louvers 48 or does not remain within the apparatus, and is reliably removed from the louvers 48, so that the cleaning works can be performed easily and quickly.

In the illustrated example, a longitudinal direction R of the louvers 48 is made horizontal as shown in FIGS. 2 and 3. However, the communicating end portion 46 may be made to be rotated about the axis 0, then the longitudinal direction R of the louvers 48 can be adjusted to be parallel to or to have a predetermined angle to the surface Q of the accumulated layer 33, so that the direction of the air flow directed to the accumulated layer 33 is adjusted.

Figure 4A:
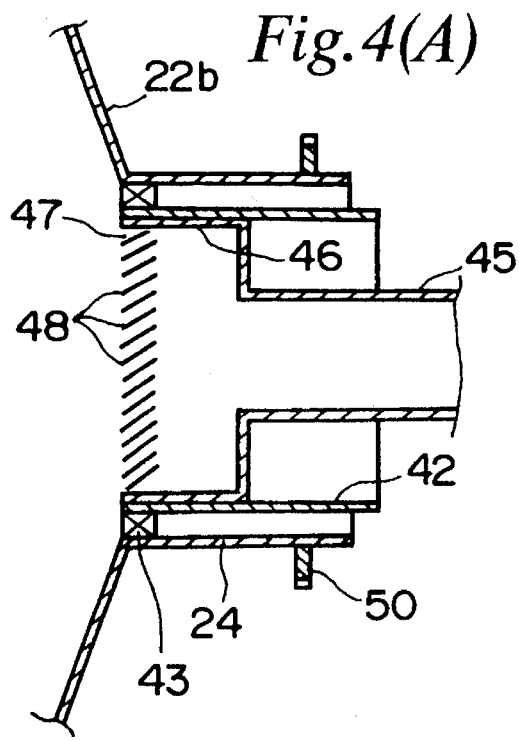
FIGS. 4(A) through 4(D) are enlarged cross-sectional views showing variational examples of the communicating end portion of the air supply duct.

FIGS. 4(A) through 4(D) are the views showing variations of the louvers 48 portion of the above-described pan coating apparatus. In the case of FIG. 4(A), the diameter of the communicating end portion 46 of the air supply duct 45 is set at a value larger than the diameter at the upstream side. Accordingly, the flow speed can be reduced at the communicating end portion 46 as compared with the case where the diameter is not increased.

Figure 4B:
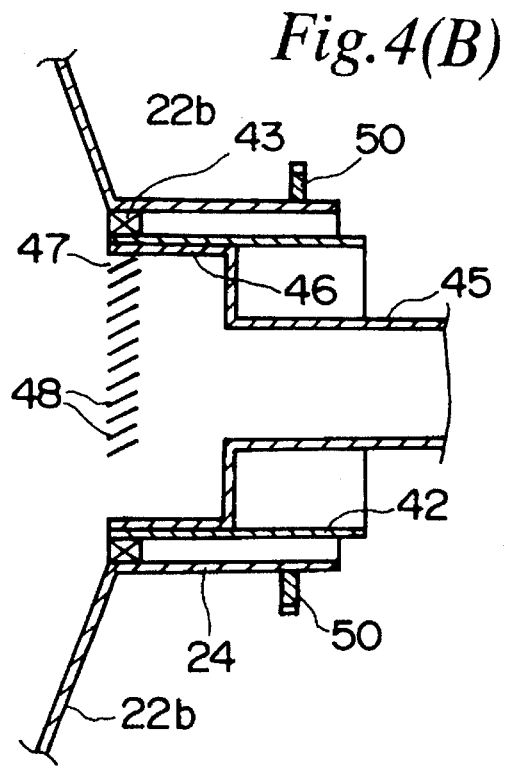

FIG. 4(B) is the case where the diameter of the communicating end portion 46 is set similarly to the case of FIG. 4(A). However, in this case, the louvers 48 are not provided at the lower portion of the outlet opening 47. By the louvers 48 which are provided at a portion higher than the lower portion of the outlet opening 47, air passing through these louvers is inclined toward the accumulated layer 33, whereby air passing through the portion where the louvers 48 are not provided is also inclined. Thus, air introduced through the outlet opening 47 is directed to the accumulated layer 33. Furthermore, as the case may be, the louvers 48 can be provided over the whole cross-section of or at a part of the outlet opening 47, so that the locus of air flow can be adjusted in accordance with a type of the powdery or granular material.

Figure 4C:
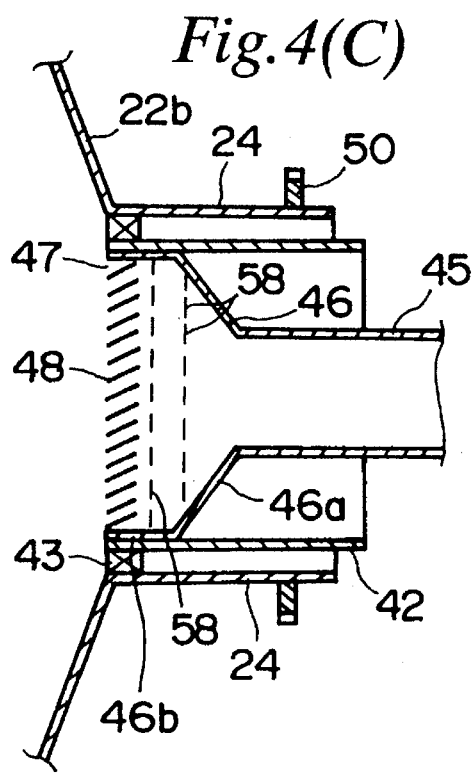
Figure 4D:
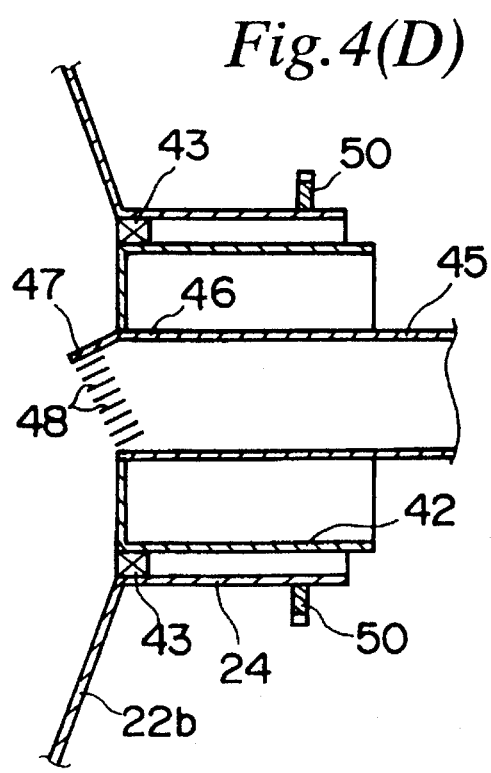

In FIG. 4(C), the communicating end portion 46 includes a truncated cone-shaped portion 46a and a cylindrical portion 46b, whereby, air from the upstream side is gradually spread to the outer peripheral portion of the communicating end portion 46. Further, a plurality of a band-shaped plate members 58, the longitudinal direction of which is horizontal, are provided as a dispersing airflow control means in the communicating end portions 46 at the upstream side in the air supply direction relative to the louvers 48, i.e., at the outer side than the louvers 48 relative to the coating chamber 26. The widthwise directions of the respective plate members 58 are vertical, and the plate members 58 are arranged vertically at spaces apart.

By these plate members 58, in the communicating end portion 46, air is spread to the outer peripheral portion and the air flow is rectified. In the embodiment illustrated in FIG. 4(C), the plate members 58 are provided in two rows in the direction of the rotary axis 0. The louvers 48 and the row of the plate members 58 next to the louvers 48 are shifted in phase, i.e., vertical positions of spaces are shifted from each other, and also, two rows of the plate members 58 are shifted in phase from each other in vertical positions of their spaces. In place of these plate members 58, another type of dispersing airflow control means such as a metal screen may be used.

The communicating end portion 46 shown in FIG. 4 (D) has a diameter equal to one shown in FIG. 1. However, in this case, the outlet opening 47 of the air supply duct 45 is inclined downwardly and a part thereof is projected into the rotary drum 20.

Figure 5:
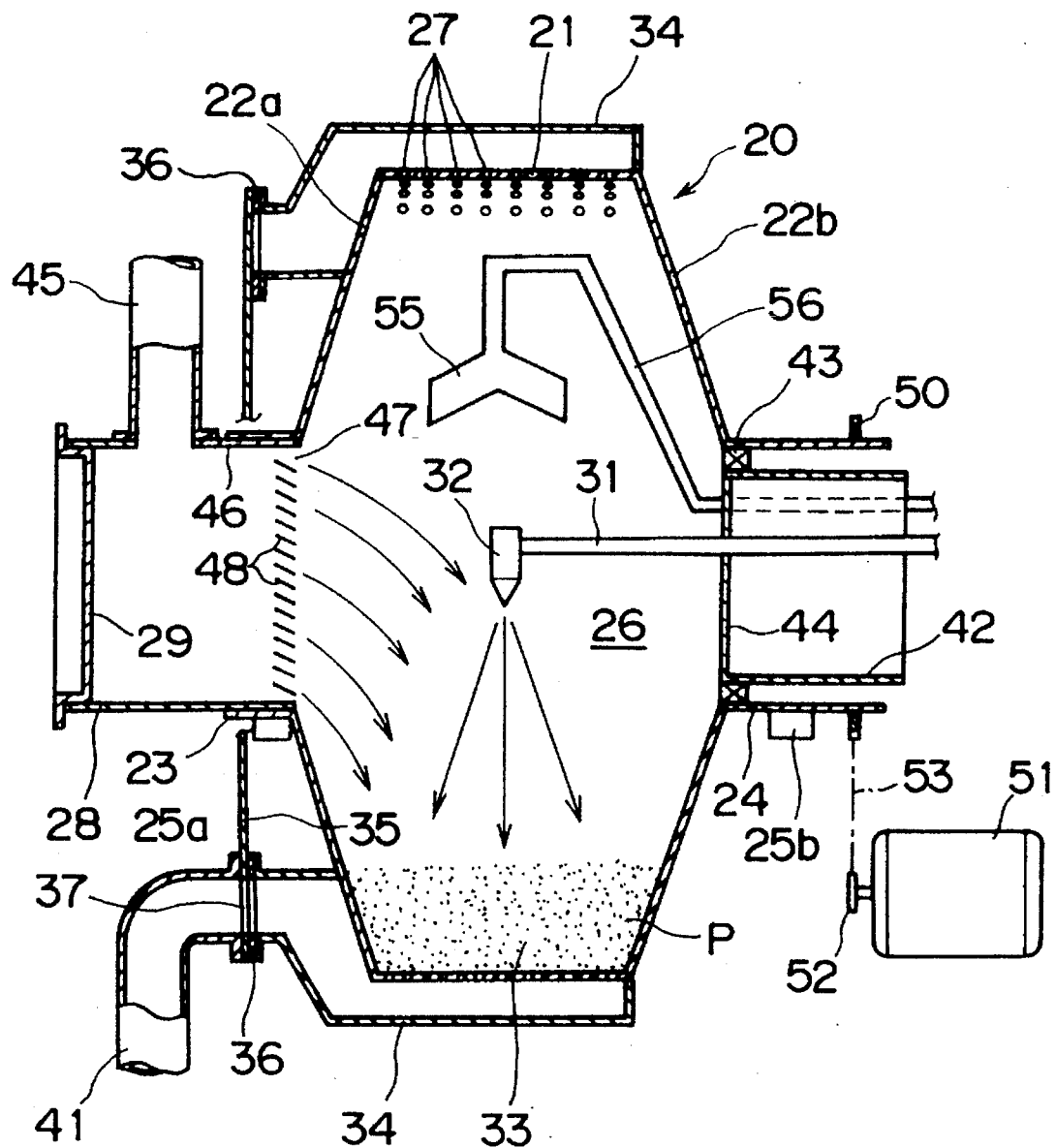
FIG. 5 is a cross-sectional view showing another embodiment of the pan coating apparatus according to the present invention.
Figure 6A:
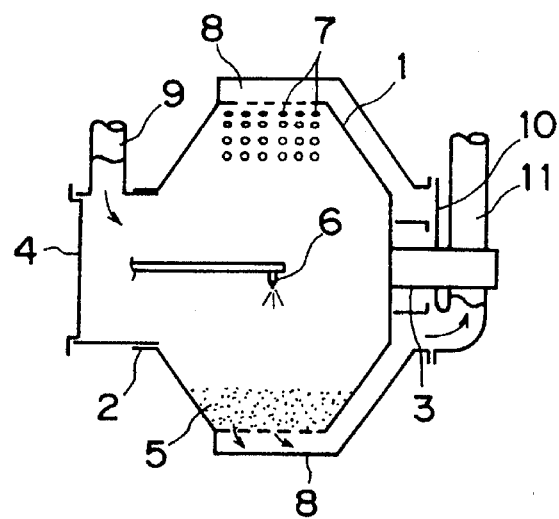
FIGS. 6(A) through 6(D) are cross-sectional views showing the conventional pan coating apparatuses.
Figure 6B:
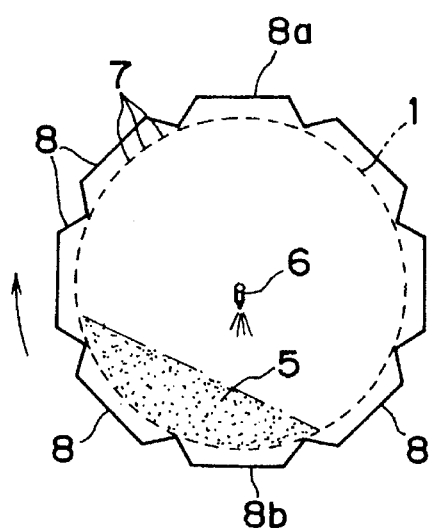
Figure 6C:
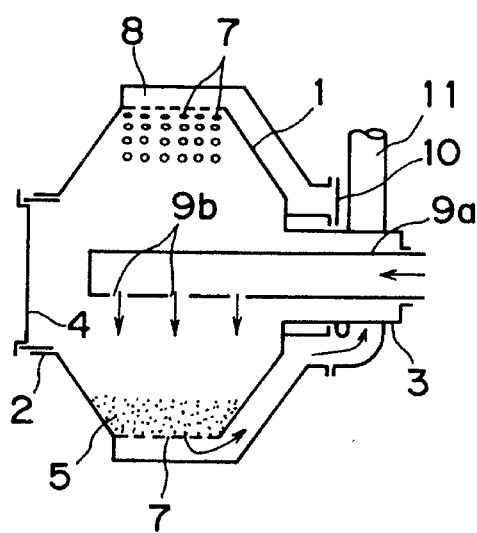
Figure 6D:
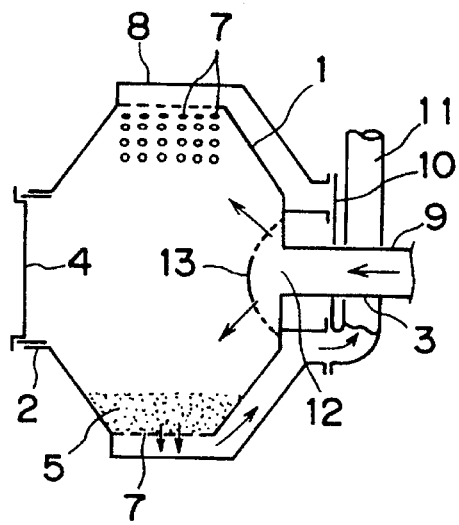

FIG. 5 is the view showing another embodiment of the pan coating apparatus according to the present invention, wherein same reference numerals are used to designate same or similar parts in the above-described embodiment.

In this case, the air supply duct 45 is connected to the cylindrical member 28 provided in the hollow shaft portion 23 on the operation side of the apparatus, and the louvers 48 are provided at the outlet opening 47 of this cylindrical member 28, differently from the above-described apparatus. Even in this type, the function similar to the above-described case can be obtained. The diameter of the outlet opening 47 can be set at various diameters other than the case shown in FIG. 5.

Although the invention completed by the present inventors has been described in detail hereinabove with reference to the embodiments, the invention should not be limited to the above-described embodiments, and it is needless to say that the invention can be variously modified within a scope of the invention.

For example, although the illustrated tubular member 21 of the rotary drum 20 has the circular cross-section, a polygonal tubular member having a polygonal cross-section may be used.

Furthermore, a tilt angle of the louvers 48 as being the guide member may be variable. In that case, all of the louvers may be interlocked with one another for their angles to be changed at the same time, or each of the louvers may be changed in its angle independently of each other.

What is claimed is:

1. An apparatus for applying coating to a powdery or granular material, comprising:

a rotary drum supported rotatably about a substantially horizontal axis, a coating chamber being defined inside the rotary drum;

a plurality of air ducts provided on an outer periphery of said rotary drum in an axial direction and communicating with said coating chamber through air holes formed in said rotary drum, respectively;

a liquid spraying means disposed within said rotary drum for spraying a liquid onto a layer of the powdery or granular material accumulated on a bottom portion of said rotary drum;

an air supply duct connected to said rotary drum for supplying a gas into said rotary drum, the air supply duct being provided with an outlet opening positioned at an end portion of said coating chamber;

an air exhaust duct disposed at a lower portion of said rotary drum for exhausting the gas in the rotary drum through said air holes, the air exhaust duct communicating with an air duct positioned at an under side of an accumulated layer of the powdery or granulated material in accordance with the rotating position of said rotary drum out of the plurality of air ducts; and a guide member formed of louvers or a plurality of plate members provided at said outlet opening, for guiding the gas supplied from said air supply duct toward the bottom portion of said rotary drum toward said accumulated layer of the powder or granulated material.

2. An apparatus as set forth in claim 1, wherein said guide member is disposed outwardly in the axial direction, with respect to the end portion of said coating chamber of said rotary drum.

3. An apparatus as set forth in claim 1, wherein said air supply duct has the outlet opening having a diameter larger than an inner diameter thereof at an upstream side.

* * * * *